United States Patent
Grier

(10) Patent No.: US 7,059,683 B2
(45) Date of Patent: Jun. 13, 2006

(54) APPARATUS FOR OPERATING COMMODITY TRAILER HOPPER TRAP DOORS

(76) Inventor: Ralph Ellis Grier, 10193 NW. South Hemple Rd., Stewartsville, MO (US) 64490

( * ) Notice: Subject to any disclaimer, the term of this patent is extended or adjusted under 35 U.S.C. 154(b) by 0 days.

(21) Appl. No.: 11/126,992

(22) Filed: May 11, 2005

(65) Prior Publication Data
US 2005/0200191 A1 Sep. 15, 2005

Related U.S. Application Data

(63) Continuation of application No. 10/771,569, filed on Feb. 4, 2004.

(51) Int. Cl.
*B60P 1/56* (2006.01)
(52) U.S. Cl. ...................................... 298/27
(58) Field of Classification Search .............. 298/24, 298/25, 27, 29, 31–34, 35 R, 36–37, 35 M, 298/30, 1 B
See application file for complete search history.

(56) References Cited

U.S. PATENT DOCUMENTS

| 2,721,761 | A | * | 10/1955 | Le Tourneau | 298/35 R |
| 4,009,906 | A | * | 3/1977 | Sweet et al. | 298/27 |
| 5,829,819 | A | | 11/1998 | Searfoss | |
| 5,887,937 | A | | 3/1999 | Searfoss | |

* cited by examiner

*Primary Examiner*—H. Gutman
(74) *Attorney, Agent, or Firm*—Stinson Morrison Hecker LLP

(57) ABSTRACT

An apparatus for operating first and second commodity trailer hopper trap doors is provided that includes a support frame extending between first and second ends, first and second driveshaft assemblies attached at each end of the support frame, a motor assembly attached to the support frame, and first and second linking mechanisms coupled between the motor assembly and the first and second driveshaft assemblies such that the motor assembly is operable to move the first and second linking mechanisms and thereby rotate the first and second driveshaft assemblies, thus operating the commodity trailer hopper trap doors. Various embodiments of the apparatus are provided.

6 Claims, 4 Drawing Sheets

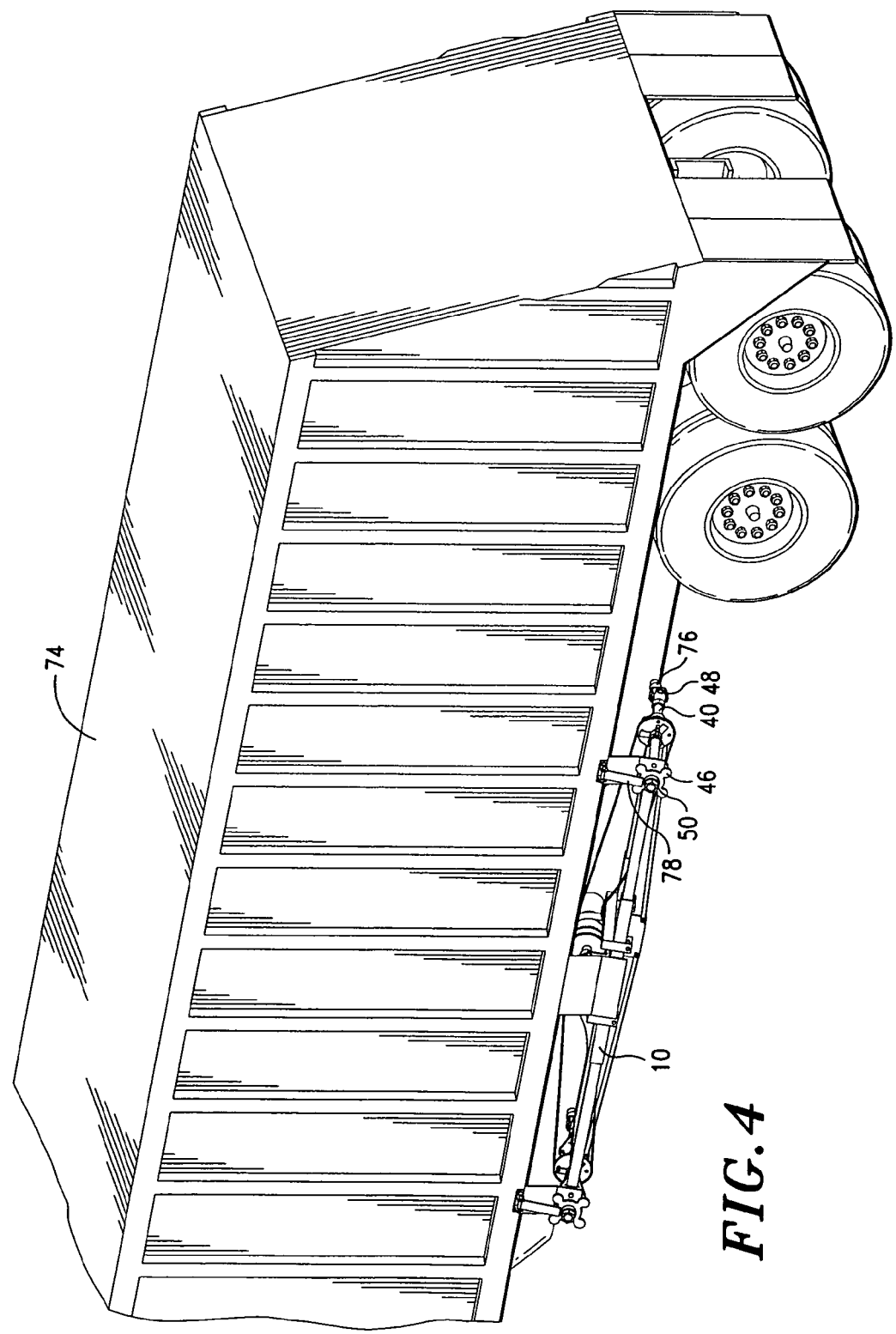

US 7,059,683 B2

APPARATUS FOR OPERATING COMMODITY TRAILER HOPPER TRAP DOORS

CROSS-REFERENCE TO RELATED APPLICATIONS

This application is a continuation of U.S. patent application Ser. No. 10/771,569 filed Feb. 4, 2004, which is hereby incorporated by reference herein in its entirety.

STATEMENT REGARDING FEDERALLY SPONSORED RESEARCH OR DEVELOPMENT

Not Applicable.

BACKGROUND OF THE INVENTION

1. Field of the Invention

The present invention relates to commodity trailers, and more particularly to powered devices for operating commodity trailer hopper trap doors.

2. Description of Related Art

Agricultural and farming industries rely heavily on trucks and commodity trailers to transport products to central distribution centers where the products are accumulated for processing or further shipment. For example, in the case of transporting grain, commodity hopper trailers are often used to carry grain from a farm to a grain elevator, where the grain is stored pending shipment to a buyer.

A typical modern commodity hopper trailer includes at least two separate hopper compartments for carrying the commodity, such as grain, each hopper compartment having an open top for loading the commodity and each hopper compartment having a discharge opening at the bottom for unloading the commodity, with a trap door covering the discharge opening. The trap door covering the discharge opening is often a horizontal sliding panel with an operating linkage adapted to be coupled to a drive shaft, although any other type of operable door covering the discharge opening, such as a hinged drop-door, is also considered a trap door. Typically, the operating linkage is a flat gear along one or both edges of the trap door operably engaged by a circular gear. The drive shaft is typically adjacent the trap door and coupled to the circular gear of the operating linkage via a universal joint, so that rotating the drive shaft turns the universal joint and the circular gear mechanism, which in turn moves the trap door to open or close the discharge opening of the hopper compartment. The drive shaft extends from the underside of the commodity trailer to an outside edge of the trailer, where its top end is accessible. The top end of the driveshaft is adapted to receive a crank handle so that an operator can attach a crank handle to the driveshaft, turn the handle to rotate the driveshaft and the universal joint coupled to the end of the drive shaft, thus moving the operating linkage coupled to the universal joint to open or close the hopper trap door.

In typical use with grain, for example, an operator drives a commodity trailer into position on the unloading ramp of a grain elevator, attaches a crank handle to the upper end of the driveshaft coupled to the operating linkage of the first hopper trap door, and then manually turns the crank handle so that the hopper trap door slides open. As the trap door opens, grain falls from the hopper through the discharge opening, down through the grates of the unloading ramp, and into the grain elevator's unloading ramp storage bins located under the ramp. After the first hopper of the commodity trailer is emptied of grain, the operator closes the hopper trap door by manually cranking the crank handle to rotate the driveshaft in the opposite direction. This unloading operation is then repeated for the second and any additional hopper trap doors, with some smaller unloading ramps requiring the trailer to be moved between unloading each hopper in order to align the hopper trap door with the unloading ramp storage bins.

As can be seen, the process of unloading the hoppers is tedious and labor intensive as each hopper trap door must be manually cranked open and closed. In addition, the time involved in manually operating each trap door is significant, which is particularly undesirable in the situation of a crowded grain elevator where many others are waiting to also unload their grain. Other disadvantages should be apparent to those skilled in the art.

BRIEF SUMMARY OF THE INVENTION

The present invention is directed to an apparatus for safely and easily operating commodity trailer hopper trap doors. The apparatus comprises a single motor configured to open two hopper trap doors. The remotely operated motor drives linking mechanisms which turn two driveshaft assemblies, each of which is adapted to be coupled to the standard operating linkage of a commodity trailer hopper trap door. The motor and driveshaft assemblies are mounted on an adjustable support frame which is adapted to be attached to a commodity trailer. The apparatus couples to the operating linkages of each hopper trap door on the commodity trailer, replacing the individual, manually-operated driveshafts. The apparatus allows two hopper trap doors to be opened and closed simultaneously using a remote handheld switch box, thus eliminating the need to manually operate each trap door separately using a manual crank handle. The apparatus is adapted to allow the operator to disengage one or both driveshaft assemblies so that operation of the motor opens only one hopper trap door. The disengaged driveshaft assembly may still be manually operated.

In one exemplary embodiment, the apparatus includes a telescopic support frame, first and second driveshaft assemblies rotatably connected to opposing ends of the support frame, a motor assembly attached to the support frame between the driveshaft assemblies, and first and second linking mechanisms coupled between the motor assembly and the first and second driveshaft assemblies, respectively. The driveshaft assemblies of the apparatus are configured to couple to the trap door operating linkage of a standard commodity hopper trailer, replacing the manually operated driveshafts, universal joints, and crank handles of the trailer. The telescopic support frame allows the apparatus to be adjusted to align the two driveshaft assemblies of the apparatus with the two original operating linkages of the two commodity trailer hopper trap doors.

BRIEF DESCRIPTION OF THE DRAWINGS

FIG. 4 is a perspective view of the apparatus of FIG. 1 attached to a commodity trailer and its associated hopper trap door linkages.

DETAILED DESCRIPTION OF EXEMPLARY EMBODIMENT

An apparatus according to an exemplary embodiment of the present invention is depicted in FIGS. 1 through 4. While the invention will be described in detail hereinbelow with reference to this embodiment, it should be understood that the invention is not limited to the specific construction shown in this embodiment. Rather, one skilled in the art will appreciate that a variety of configurations may be implemented in accordance with the present invention.

Figure 1:
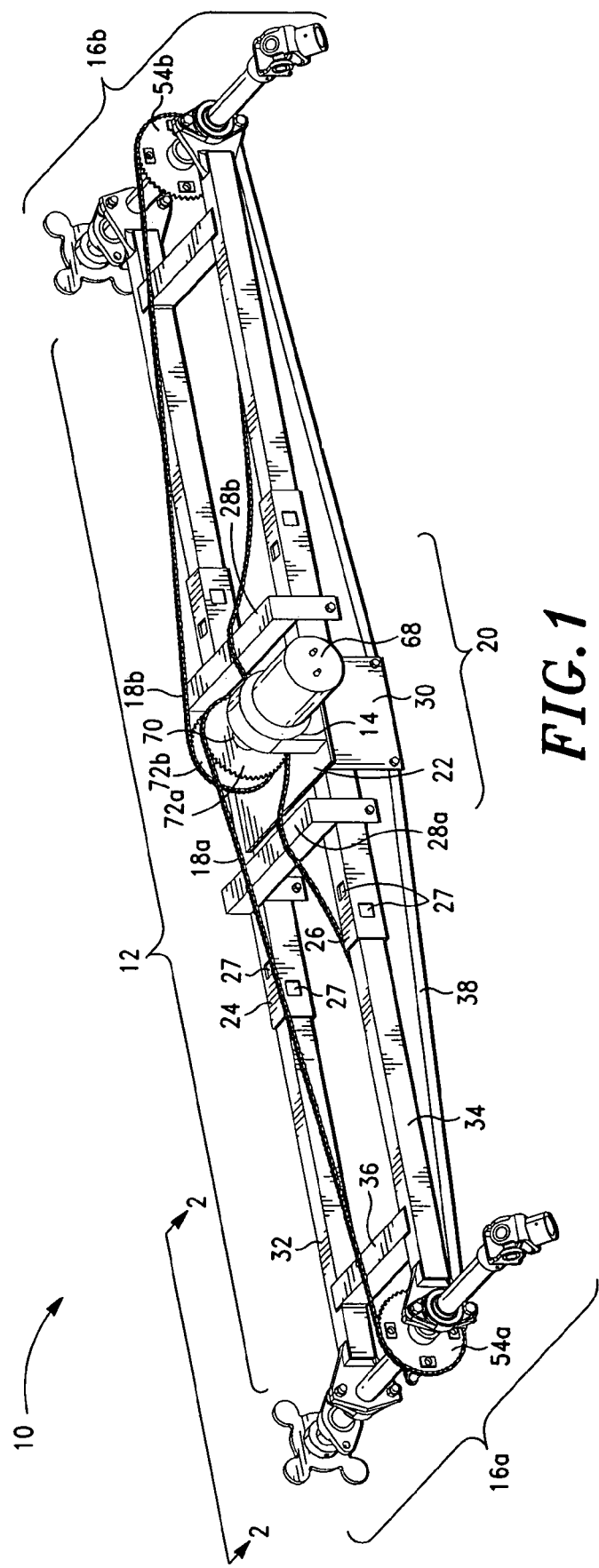
FIG. 1 is a perspective view of an exemplary embodiment of the apparatus of the present invention.

Looking first to FIG. 1, a commodity trailer trap door operating apparatus in accordance with an exemplary embodiment of the present invention is depicted generally by the designation 10. The apparatus includes a telescopically adjustable support frame 12, a single motor assembly 14, and drive shaft assemblies 16a, 16b located at opposite ends of support frame 12, each drive shaft assembly 16a, 16b being linked to motor assembly 14 via chains 18a, 18b. As the apparatus is generally symmetrical about the center axis of motor assembly 14, the description of the structure on one end of the apparatus applies equally to the structure at the opposite end.

Figure 3:
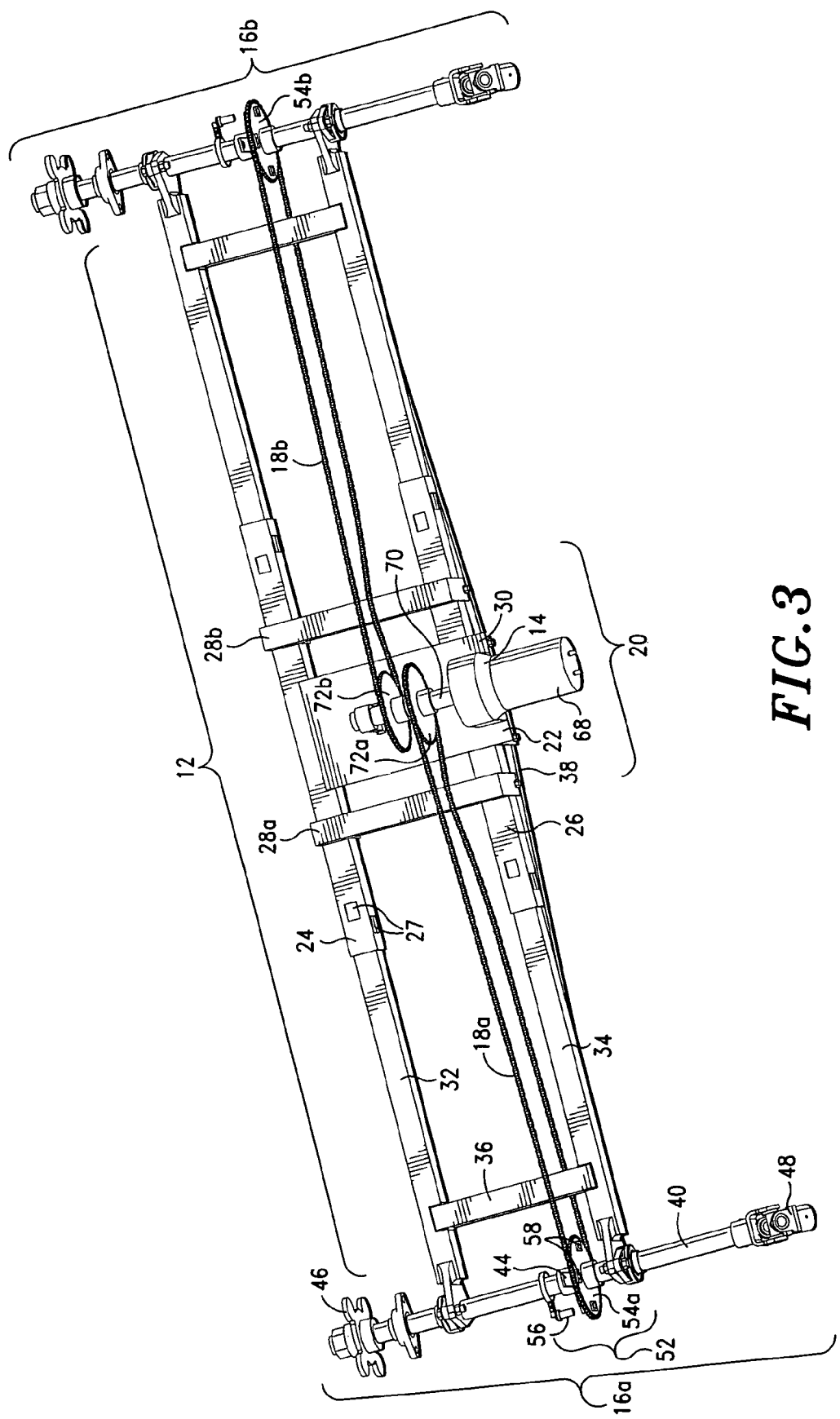
FIG. 3 is a plan view of the apparatus of FIG. 1.

Looking to the exemplary embodiment shown in FIGS. 1 and 3, support frame 12 has first and second ends, with a center portion 20 located midway between the ends. Center portion 20 includes a motor mounting plate 22 secured to the top surfaces of parallel upper and lower receiving arms 24, 26 which extend outwardly from motor mounting plate 22 towards the end of the apparatus. Each receiving arm 24, 26 is a hollow, square-shaped box beam, with welding apertures 27 formed along the inner, facing surfaces of each receiving arm 24, 26.

Inner support bar 28a, parallel to the edge of motor mounting plate 22, extends between, and is secured against, the top surfaces of upper and lower receiving arms 24, 26. A brace plate 30, perpendicular to motor mounting plate 22, extends downwardly from motor mounting plate 22, and is secured to the outer surfaces of lower receiving arm 26.

Upper and lower telescoping arms 32, 34 extend from within upper and lower receiving arms 24, 26, respectively, outwardly to the end of support frame 12. Each telescoping arm 32, 24 is a square-shaped box-beam, sized so that it fits snugly within the like-shaped hollow inner portion of the corresponding receiving arm 24, 26. Outer support bar 36 near the end of support frame 12 extends between, and is secured to, upper and lower telescoping arms 32, 34. Together, telescoping arms 32 and 34 form a telescoping extension. Brace arm 38 extends alongside lower telescoping arm 34 and attaches between drive shaft assembly 16a and brace plate 30 at center portion 14 of support frame 12.

Upper and lower telescoping arms 32, 34 allow the apparatus to be adjusted to fit commodity trailers with varying spacing between the existing trap door linkages. Apparatus 10 as shown is adjustable to fit the typical spacing between trap door operating linkages on a commodity trailer of between 7.5 and 9 feet, but configurations adjustable to spacing less than or greater than this typical spacing are also encompassed by the present invention. After adjusting to a particular trailer, telescoping arms 32, 34 are welded or bolted to receiving arms 24, 26, respectively, and the apparatus is mounted to the commodity trailer. Welding apertures 27 along the inner face of upper and lower receiving arms 24, 26 permit telescoping arms 32, 34 to be welded to the corresponding receiving arm at several points along the coupled arms to provide a more secure attachment between the two that is not susceptible to breaking or cracking as is a single-point weld.

While support frame 12 is shown constructed from box-beam and square stock material, any strong, rigid material may be used without deviating from the scope of the present invention. For example, support frame 12 may be made from tubular or angle stock, and may be constructed in a non-adjustable, fixed configuration. Such variations are anticipated by, and within the scope of, the present invention.

Figure 2:
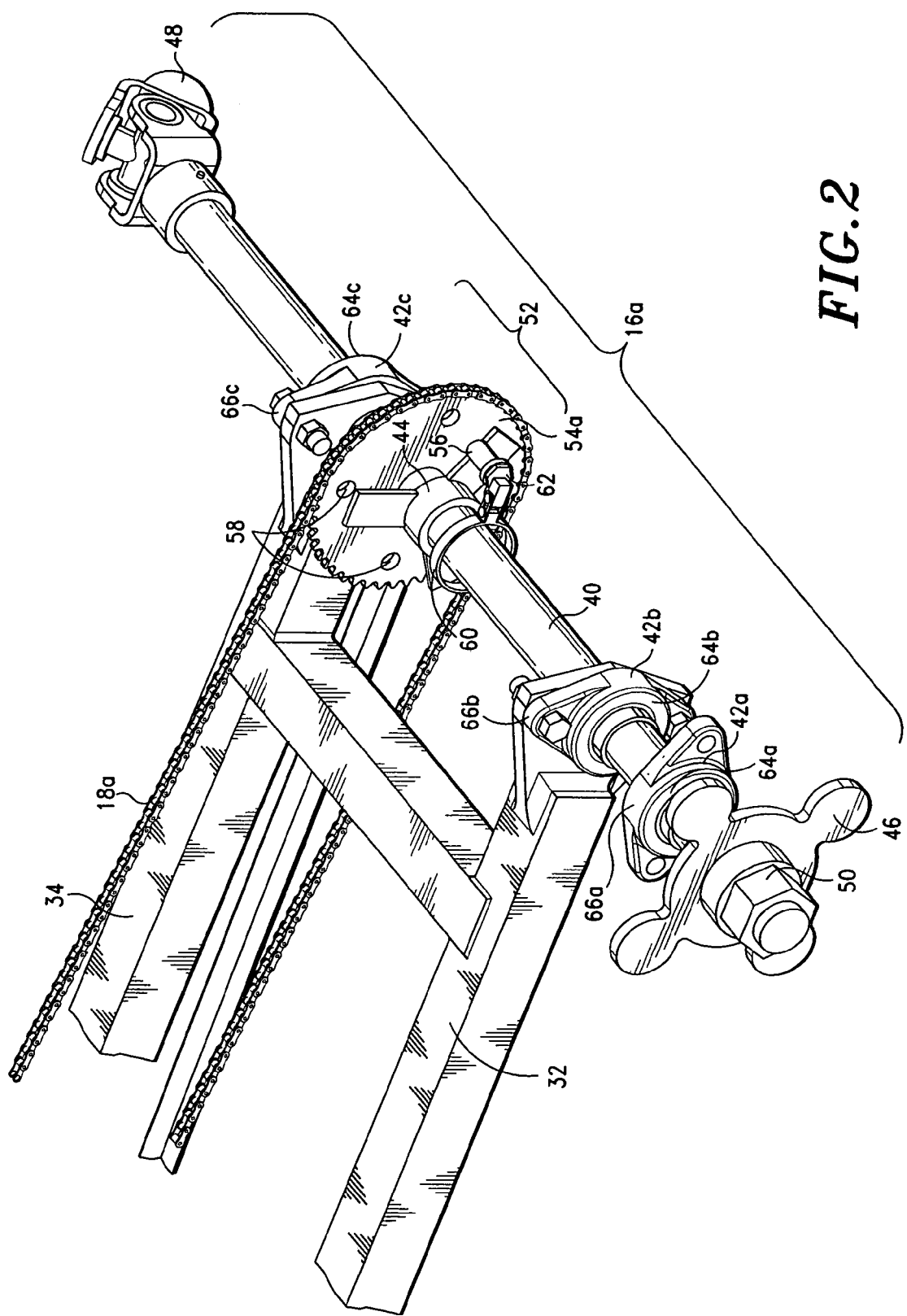
FIG. 2 is an enlarged, partial perspective view of one end of the apparatus of FIG. 1, taken along line 2—2.

As best seen in FIG. 2, drive shaft assembly 16a includes a drive shaft 40 that extends though bearing assemblies 42a, 42b, 42c. A drive hub 44 having three protruding spokes is affixed to drive shaft 40 between bearing assemblies 42b, 42c. A lobed turning handle 46 is affixed to one end of drive shaft 40, and a universal joint 48 is affixed to the opposite end. A coupler 50 protrudes outwardly from lobed handle 46, and is affixed to the end of drive shaft 40 to hold lobe handle 46 in place on drive shaft 40. Coupler 50 further allows a crank or handle to be attached to the end of drive shaft 40 in order to manually rotate it. While coupler 50 is shown as a hexagonal bolt, any coupling device known in the art may be used. Thus, drive shaft 40, drive hub 44, universal joint 48, lobed handle 46, and coupler 50 are fixedly connected together. While drive hub 44 is shown having three protruding spokes, various configurations having a greater or lesser number of protrusions or spokes are contemplated by the present invention. Similarly, as noted above, the structure and components of support frame 12 are exemplary only.

Engagement mechanism 52 is operably connected to chain 18a, and is configured to allow coupling or de-coupling drive hub 44 to or from drive shaft 40. Engagement mechanism 52 comprises a drive sprocket 54a and an engagement pin 56. Drive sprocket 54a is rotatably mounted on driveshaft 40, and is captured on driveshaft 40 between bearing assembly 42c and drive hub 44. Engagement apertures 58 extending through the face of drive sprocket 54a are located at intervals around an inner circumference of the drive sprocket. Engagement pin 56 is sized to fit snugly within engagement apertures 58. A retaining collar 60 around drive shaft 40 is secured to engagement pin 56 via a flexible link 62. Collar 60 and flexible link 62 keep engagement pin 56 from being dropped or lost when it is not engaged within an engagement aperture 58. Collar 60, moveable along driveshaft 40, and flexible link 62 allow engagement pin 56 to be moved so that it can be placed into an engagement aperture 58 on drive sprocket 54a.

Bearing assemblies 42a, 42b, 42c, each comprise a bearing 64a, 64b, 64c, respectively, secured within a frame 66a, 66b, 66c, respectively. Bearing assemblies 42b, 42c are attached to the ends of telescoping arms 32, 34, respectively. Drive shaft assembly 16a extends through bearing assemblies 42a, 42b, 42c such that drive shaft assembly 16a is rotatably connected to the outer end of the support frame.

Turning back to FIGS. 1 and 3, motor assembly 14, comprising a drive motor 68 and a motor shaft 70, with first and second motor sprockets 72a, 72b fixedly connected to motor shaft 70, is mounted to motor mounting plate 22 at center portion 20 of support frame 12. Drive motor 68 is a twelve volt, direct current (DC), reversible, high-torque, low-RPM (revolutions per minute) winch motor, operated through a remote cable. Other drive motors and mechanisms will be apparent to those skilled in the art, and may be employed without deviating from the scope of the present invention. For example, an alternating current (AC) motor or a non-electric drive motor, such as a hydraulic motor, may also be used to turn the drive sprockets, depending upon the available power supplies on the trailer towing vehicle or at the grain elevator or commodity unloading facility.

A first chain 18a extends between first motor sprocket 72a to drive sprocket 54a at a first end of support frame 12, and a second chain 18b extends between second motor sprocket 72b to drive sprocket 54b at a second end of support frame 12. Each of the continuous chains 18a, 18b is routed so that it extends from the upper portion of the corresponding motor sprocket 72a, 72b at center portion 20 of support frame 12 to and around the corresponding drive sprocket 54a, 54b at the corresponding end of support frame 12, then extends back to and around motor sprocket 72a, 72b. The chain 18a, 18b returning to motor sprocket 72a, 72b is routed over the corresponding inner support arm 28a, 28b so that it contacts the support arm, providing tension to the chain and preventing it from disengaging from the sprockets. Thus, chains 18a, 18b act as linking mechanisms between motor assembly 14 and drive shaft assemblies 16a and 16b via motor sprockets 72a, 72b, respectively, and the drive sprockets 54a, 54b.

While the configuration of the apparatus shown and described is generally symmetrical, with motor assembly 14 centered on support frame 12 and driveshaft assemblies 16a, 16b located at opposite ends of support frame 12, variations from this configuration will be apparent to those skilled in the art. For instance, the motor need not be at the center of the support frame, but may be mounted at one end of the frame, or even be mounted on an extension from the support frame. Likewise, the drive and linking mechanisms need not be sprockets and chains. Other drive methods, such as pulleys and belts may be employed. In addition, embodiments of the present invention may include additional drive shaft assemblies mounted along a longer support frame in order to operate more than two commodity trailer trap doors.

As seen in FIG. 4, in use, apparatus 10 is mounted to a commodity trailer 74 having two hopper trap doors, with universal joints 48 of apparatus 10 attaching to the trap door operating linkage 76 of trailer 74, replacing the standard manual cranks and driveshafts used to operate the commodity trailer trap doors. The apparatus is telescopically adjusted so that the drive shafts of the apparatus are spaced to match the spacing of the original drive shafts on the trailer. The arms of the support frame are fixed in place by welding the telescoping portion of the arm to the receiving portion of the arm at the entry point of the receiving arm and at the welding aperture. The original drive shafts and universal joints are removed, and apparatus 10 is attached by welding or bolting support frame 12 of the apparatus to the side and lower frame or "bang bar" of the trailer. Both the support frame and the housings of the bearing assemblies may be attached to the trailer to provide additional support. The universal joints of each drive shaft assembly of the apparatus are coupled to the original trap door operating linkages on the trailer. Thus, the original driveshafts and universal joints of the commodity trailer are replaced by the driveshafts and universal joints of the apparatus.

Returning to FIG. 3, in operation, engagement mechanism 52 is enabled by placing engagement pin 56 into an engagement aperture 58 on drive sprocket 54a of the drive assembly 16a. An operator supplies power to motor 68 through a remote cable and switch assembly which provides power and allows starting, stopping, and reversing motor 68. Power for motor 68 may be obtained from the trailer towing vehicle, from a self-contained battery supply, or from any other suitable power supply. Powering motor 68 turns motor shaft 70 and first and second motor sprockets 72a, 72b which are affixed to motor shaft 70. Motor sprockets 72a, 72b engage with and turn chains 18a, 18b, which in turn rotate drive sprockets 54a, 54b at the end of the apparatus. If engagement assembly 52 is not enabled (i.e., engagement pin 56 is not placed into an engagement aperture 58 on drive sprocket 54a), drive sprocket 54a simply free-wheels around drive shaft 40. However, when engagement assembly 52 is enabled (i.e., engagement pin 56 is placed into an engagement aperture 58 on drive sprocket 54a), then the turning drive sprocket 54a rotates and carries engagement pin 56, and engagement pin 56 contacts a spoke of drive hub 44 and thus rotates drive hub 44 and affixed drive shaft 40 and universal joint 48 affixed at the end of drive shaft 40. With universal joint 48 coupled to the trap door operating linkage on the commodity trailer, the rotation of drive shaft 40 and universal joint 48 operates the trap door operating linkage and the commodity trailer trap door moves. By reversing the direction of motor 68, the commodity trailer trap door can also be moved in the opposite direction. By selectively enabling the engagement mechanisms at either end of the apparatus, an operator may safely, easily, and remotely open or close either, or both, commodity trailer hopper trap doors.

Lobed handle 46 fixedly coupled to the upper end of drive shaft 40 allows an operator to manually turn driveshaft 40 to operate the commodity trailer trap door, if necessary. In addition, as shown in FIG. 4, lobed handle 46 can engage with a locking bar 78 pivotally mounted on the side of the commodity trailer, near lobed handle 46. During transport, locking bar 78 is pivoted into position such that it engages between adjacent lobes on lobed handle 46, thus preventing the drive assemblies from rotating while the trailer is being transported, preventing inadvertent operation of the commodity trailer trap doors. Prior to operating the apparatus, the operator flips locking bar 78 up and out of the way so that the drive shaft 40 may rotate unimpeded. Coupler 50 protruding from lobed handle 46 permits a crank handle or extension to be coupled to driveshaft 402, likewise allowing manual operation of the commodity trailer trap door.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and sub-combinations. This is contemplated by and is within the scope of the claims.

The invention claimed is:

1. An apparatus for operating first and second commodity trailer hopper trap doors, comprising:
   a support frame extending between a first end and a second end;
   first and second driveshaft assemblies rotatably connected to said support frame proximate said first and second ends, respectively, wherein said first and second driveshaft assemblies are configured to be coupled to said first and second commodity trailer hopper trap doors, respectively;

a single motor assembly attached to said support frame; and first and second linking mechanisms coupled between said single motor assembly and said first and second driveshaft assemblies, respectively;

wherein said single motor assembly is operable to move said first and second linking mechanisms to thereby rotate said first and second driveshaft assemblies, respectively, and thereby operate said first and second commodity trailer hopper trap doors, respectively.

2. The apparatus of claim 1, wherein said apparatus further comprises first and second engagement mechanisms operable to selectively couple said first and second linking mechanisms, respectively, to said first and second driveshaft assemblies, respectively, such that said first and second driveshaft assemblies are independently operable by said single motor assembly.

3. The apparatus of claim 1, wherein said first driveshaft assembly comprises a lobed handle coupled to said first driveshaft assembly for allowing manual rotation of said first driveshaft assembly.

4. An apparatus for operating first and second commodity trailer hopper trap doors, comprising:

first and second means for operating the first and second commodity trailer hopper trap doors, respectively;

a single means for driving said operating means;

means for supporting said operating and driving means first and second means for linking said driving means to said first and second operating means, respectively; and first and second means for selectively engaging said first and second linking means with said first and second operating means, respectively.

5. A method of operating first and second commodity trailer hopper trap doors, comprising:

providing first and second driveshaft assemblies coupled to said first and second commodity trailer hopper trap doors, respectively;

providing a single motor assembly disengageably coupled to said first and second driveshaft assemblies; and operating said motor assembly to rotate at least one of said driveshafts to operate at least one of said trap doors.

6. The method of claim 5, further comprising:

selectively engaging at least one of said driveshafts to said motor assembly.

* * * * *